United States Patent
Liang et al.

(10) Patent No.: US 10,809,943 B2
(45) Date of Patent: Oct. 20, 2020

(54) DATA PROCESSING METHOD FOR IMPROVING UTILIZATION RATE AND PROGRAM TIME AFTER SUDDEN POWER OFF EVENT AND ASSOCIATED DATA STORAGE DEVICE

(71) Applicant: Silicon Motion, Inc., Jhubei, Hsinchu County (TW)

(72) Inventors: Chia-Chi Liang, Zhubei (TW); Hsuan-Ping Lin, Taichung (TW)

(73) Assignee: Silicon Motion, Inc., Hsinchu County (TW)

(*) Notice: Subject to any disclaimer, the term of this patent is extended or adjusted under 35 U.S.C. 154(b) by 0 days.

(21) Appl. No.: 16/255,915

(22) Filed: Jan. 24, 2019

(65) Prior Publication Data

US 2019/0227748 A1  Jul. 25, 2019

(30) Foreign Application Priority Data

Jan. 24, 2018  (TW) .............................. 107102524 A

(51) Int. Cl.
*G06F 13/00* (2006.01)
*G06F 3/06* (2006.01)
*G06F 11/07* (2006.01)

(52) U.S. Cl.
CPC .......... *G06F 3/0659* (2013.01); *G06F 3/0604* (2013.01); *G06F 3/064* (2013.01); *G06F 3/0619* (2013.01); *G06F 3/0673* (2013.01); *G06F 3/0679* (2013.01); *G06F 11/076* (2013.01); *G06F 11/0727* (2013.01)

(58) Field of Classification Search
None
See application file for complete search history.

(56) References Cited

U.S. PATENT DOCUMENTS

| 9,501,404 | B2* | 11/2016 | Palmer ................ G06F 12/0246 |
| 2010/0070729 | A1* | 3/2010 | Ng ........................ G06F 3/0617 |
| | | | 711/166 |
| 2015/0143035 | A1 | 5/2015 | Choi et al. |
| 2015/0317210 | A1* | 11/2015 | Palmer ................ G06F 12/0246 |
| | | | 714/6.3 |
| 2016/0232053 | A1* | 8/2016 | Lin ....................... G06F 11/108 |
| 2016/0378359 | A1 | 12/2016 | Jang et al. |

(Continued)

FOREIGN PATENT DOCUMENTS

| TW | 201428757 A | 7/2014 |
| TW | 201631586 A | 9/2016 |
| TW | 201701291 A | 1/2017 |

*Primary Examiner* — Sean D Rossiter
(74) *Attorney, Agent, or Firm* — Winston Hsu

(57) ABSTRACT

A data storage device includes a memory controller and a memory device. The memory controller includes multiple memory blocks, and each memory block includes multiple pages. The memory controller is coupled to the memory device and configured to access the memory device. In an initialization procedure of the data storage device, the memory controller is configured to determine whether a sudden power-off has occurred during a first write operation to write data to a first memory block, and when a sudden power-off is determined to have occurred during the first write operation, the memory controller is configured to select a second memory block that is and write data to the second memory block in a second write operation.

8 Claims, 6 Drawing Sheets

(56) References Cited

U.S. PATENT DOCUMENTS

2017/0286687 A1* 10/2017 Teglia .................... G06F 21/554
2017/0364265 A1* 12/2017 Lin ......................... G06F 3/061
2018/0232169 A1*  8/2018 Liang .................... G06F 3/0604

* cited by examiner

|     |    | SB0 |     |     | SB1 |     |     | SB2...SB9 |     |     | SB10 |     |     | SB11 |     |
| --- | --- | --- | --- | --- | --- | --- | --- | --- | --- | --- | --- | --- | --- | --- | --- |
|     | XP | UP | LP | XP | UP | LP | XP | UP | LP | XP | UP | LP | XP | UP | LP |
| ... | ... | ... | ... | ... | ... | ... | ... | ... | ... | ... | ... | ... | ... | ... | ... |
| WL8 | 204 | 205 | 134 | 207 | 208 | 137 | ... | ... | ... | 234 | 235 | 164 | 237 | 238 | 167 |
| WL9 | 240 | 241 | 170 | 243 | 244 | 173 | ... | ... | ... | 270 | 271 | 200 | 273 | 274 | 203 |
| WL10 | 276 | 277 | 206 | 279 | 280 | 209 | ... | ... | ... | 306 | 307 | 236 | 309 | 310 | 239 |
| WL11 | 312 | 313 | 242 | 315 | 316 | 245 | ... | ... | ... | 342 | 343 | 272 | 345 | 346 | 275 |
| ... | ... | ... | ... | ... | ... | ... | ... | ... | ... | ... | ... | ... | ... | ... | ... |

FIG. 3

DATA PROCESSING METHOD FOR IMPROVING UTILIZATION RATE AND PROGRAM TIME AFTER SUDDEN POWER OFF EVENT AND ASSOCIATED DATA STORAGE DEVICE

CROSS REFERENCE TO RELATED APPLICATIONS

This Application claims priority of Taiwan Patent Application No. 107102524, filed on Jan. 24, 2018, the entirety of which is incorporated by reference herein.

BACKGROUND OF THE INVENTION

Field of the Invention

The invention relates to a data storage device and a data processing method capable of solving a problem of a decreasing utilization rate and a time consuming problem of a flash memory device, which may rise when applying some protection mechanism to prevent the data stored in the flash memory device from being damaged by a sudden power-off.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

Generally, if a sudden power-off occurs during the programming of a flash memory device, the data being written into the memory device at the time of the power-off, or data that has already been written into the memory device, may be damaged. For example, when the flash memory device undergoes a sudden power-off when writing data, in addition to potentially damaging the data currently being written into the page, the data stored in other pages (the paired page, for example) located on the same word line as the page currently being written may also be damaged. To avoid data being damaged by the sudden power-off, a protection scheme is implemented. For example, some pages will be written with dummy data, or some data will be rewritten into the memory device, so as to stabilize the data stored in the memory device. However, as the size of the flash memory increases, the distance between the paired pages increases, and the time required for performing a write operation increases as well. In addition, the dummy write operations or the rewrite operations also cause the utilization rate of the flash memory device to be greatly decreased.

In view of this, a data storage device and a data processing method capable of solving the problem of a decreasing utilization rate and the time consuming problem of a flash memory device, which may rise when preventing the data stored in the flash memory device from being damaged by the sudden power-off discussed above, are proposed.

BRIEF SUMMARY OF THE INVENTION

Data storage devices and data processing methods are provided. An exemplary embodiment of a data storage device comprises a memory device and a memory controller. The memory controller comprises a plurality of memory blocks, and each memory block comprises a plurality of pages. The memory controller is coupled to the memory device and configured to access the memory device. In an initialization procedure of the data storage device, the memory controller is configured to determine whether a sudden power-off has occurred during a first write operation to write data to a first memory block, and when a sudden power-off is determined to have occurred during the first write operation, the memory controller is configured to select a second memory block that is different from the first memory block and write data to the second memory block in a second write operation performed subsequently.

An exemplary embodiment of a data processing method for a data storage device comprising a memory device and a memory controller, wherein the memory device comprises a plurality of memory blocks, each memory block comprises a plurality of pages, and the memory controller is coupled to the memory device and configured to access the memory device. The method comprises: in an initialization procedure of the data storage device, determining whether a sudden power-off has occurred during a first write operation to write data to a first memory block by the memory controller; and when a sudden power-off is determined to have occurred during the first write operation, selecting a second memory block different from the first memory block and writing data to the second memory block in a second write operation performed subsequently by the memory controller.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 3 is a diagram showing the arrangement of the indices of multiple pages according to an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
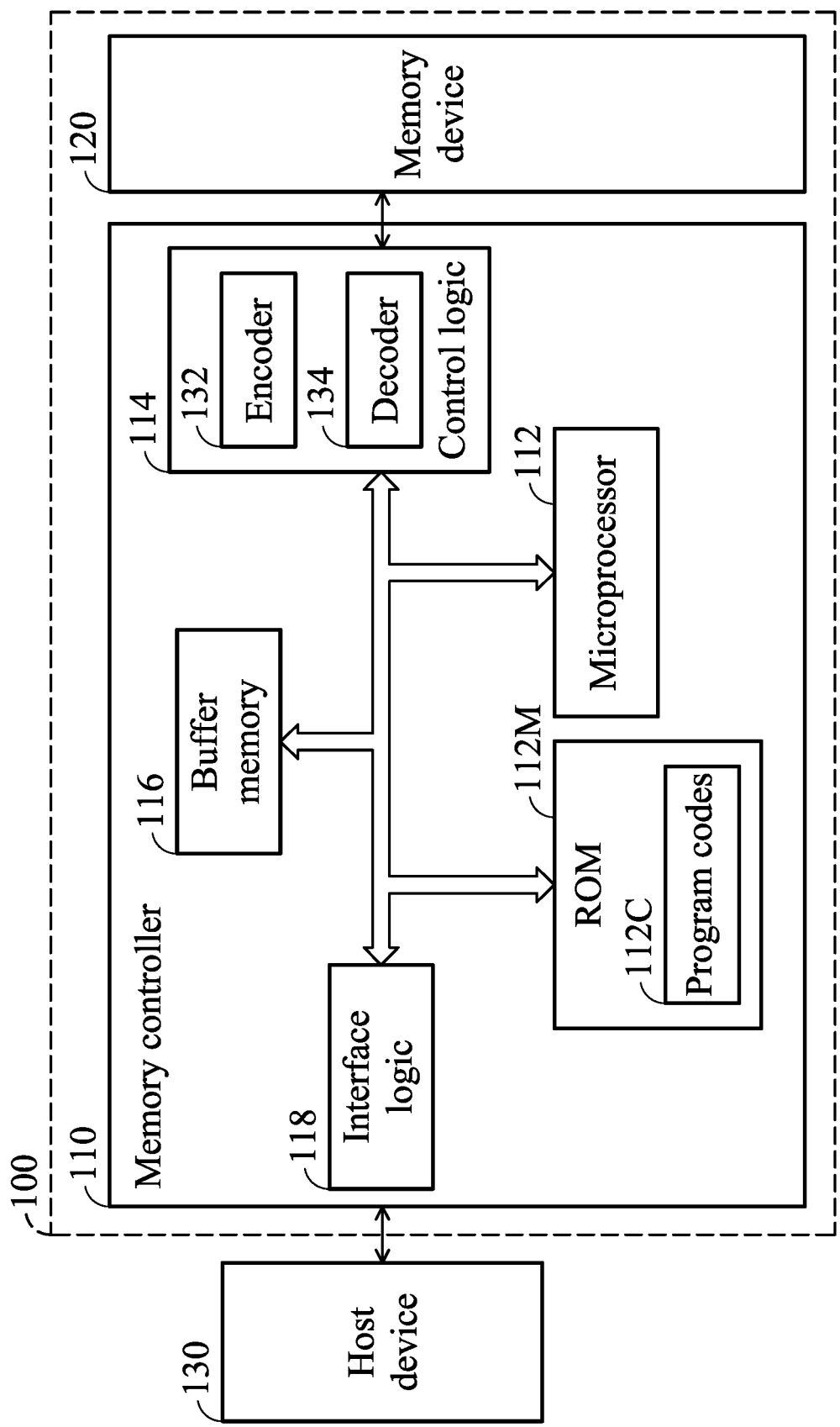
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages, and the access unit of a write operation performed by the controller (e.g., the memory controller 110, through the execution of the program codes 112C by the microprocessor 112) on the memory device 120 may be one page.

In practice, the memory controller 110 may perform various control operations by using its own internal components through the execution of the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. The buffer memory 116 may be implemented by a Random Access Memory (RAM). For example, the buffer memory 116 may be an SRAM, but the invention should not be limited thereto.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the Universal Flash Storage (UFS) or the Embedded Multi Media Card (EMMC) standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

Figure 2:
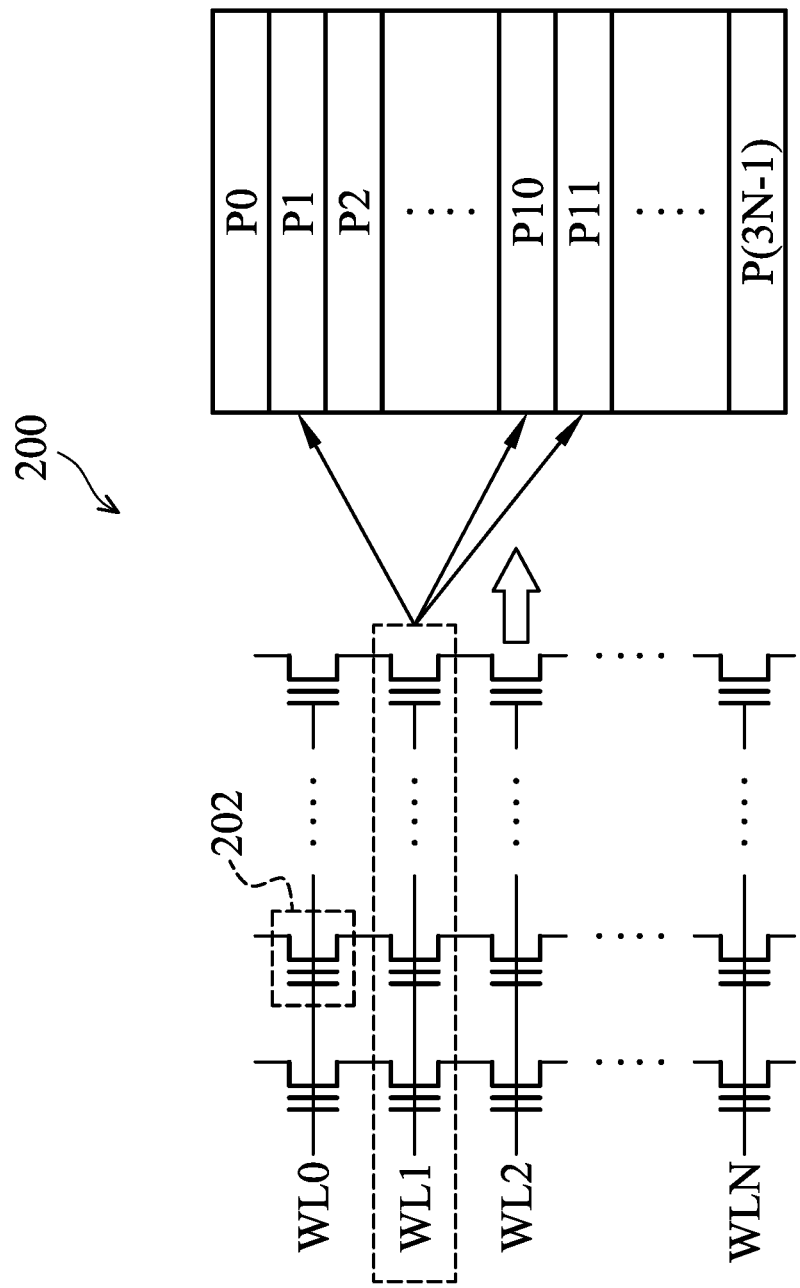
FIG. 2 is a schematic diagram of a memory block of the memory device according to an embodiment of the invention.

According to an embodiment of the invention, the memory blocks comprised in the memory device 120 may comprise a plurality of Multiple-Level Cell (MLC) memory blocks or Triple-Level Cell (TLC) memory blocks. In the following embodiments, TLC memory blocks will be utilized for illustration. FIG. 2 is a schematic diagram of a memory block 200 of the memory device 120 according to an embodiment of the invention. As shown in FIG. 2, the memory block 200 has a Triple-Level cell structure. The memory block 200 comprises N word lines WL0~WLN, where N is a positive integer. Each word line may form three pages. Therefore, the memory block 200 comprises 3*N pages (e.g. P0~P(3N-1)). Each storage unit (that is, each floating gate transistor 202) shown in FIG. 2 is configured to store 3 bits, comprising the least significant bit (LSB), the central significant bit (CSB) and the most significant bit (MSB). The LSB of the storage units on each one of the word lines WL0~WLN form the first page (that is, the LSB page or Lower Page (LP)) corresponding to that word line, the CSB of the storage units on each one of the word lines WL0~WLN form the second page (the CBS page) corresponding to that word line and the MSB of the storage units on each one of the word lines WL0~WLN form the third page (the MBS page or eXtra Page (XP)) corresponding to that word line.

It should be noted that, in the embodiments of MLC memory blocks, each storage unit is configured to store multiple bits (that is, more than one bit).

Generally, the three pages on the same word line may not have consecutive indices. For example, the LSBs stored in the storage units on the word line WL1 form page P1, the CSBs stored in the storage units on the word line WL1 form page P10, and the MSBs stored in the storage units on the word line WL1 form page P11.

Generally, when the LSB page on the word line WL1 (that is, the page P1 shown in FIG. 2) is damaged because a sudden power-off (SPO) has occurred during a write operation writing data to the LSB page, the CSB page on the word line WL1 (that is, the page P10 shown in FIG. 2) and the MSB page on the word line WL1 (that is, the page P11 shown in FIG. 2) can no longer be used. In addition, when the MSB page or the CSB page on the word line WL1 is damaged because an SPO has occurred during a write operation writing data to the MSB page or the CSB page, the data stored in the LSB page on the word line WL1 will be damaged as well.

Therefore, in the current design, in order to prevent the data stored in the pages from being damaged by an SPO, a protection mechanism will be applied. For example, when the page that undergoes an SPO attack is the LSB page (hereinafter called LP), the memory controller 110 is configured to write dummy or invalid data till the paired page of the LP undergoing the SPO attack, that is, the CSB page (hereinafter called UP) and the MSB page (hereinafter called XP) on the same word line. In another example, when the page undergoing an SPO attack is the CSB page (UP) or the MSB page (XP), in order to stabilize the data stored in the corresponding pages, a portion of data that have been programmed will be rewritten to other empty pages, and the data that should be rewritten are traced back from the attacked page till the paired page of the attacked page (that is, the LSB (LP) on the same word line). If it is impossible to determine which page was attacked by the SPO event, both protection mechanisms discussed above may be applied, so as to ensure that the data stored in the pages will not be damaged by the SPO attack.

Take FIG. 2 as an example: suppose that the page P1 is damaged, if the memory controller 100 still wants to write data to the remaining pages of the memory block 200, in order to avoid erroneously writing data to the pages P10 and P11 on the word line WL1, the memory controller 110 may write dummy or invalid data from page P1 till page P11, and then write valid data in the memory block 200 from page P12. As discussed above, although writing data to the pages P10 and P11 can be avoided, the memory space of pages P2~P9 are also wasted. The problem of wastage is more serious when the memory device 120 is a 3D NAND-type flash since the distances between the LSB page, CSB page and the MSB page have become larger (that is, the difference between the corresponding page indices is larger). Therefore, more pages will be wasted.

FIG. 3 is a diagram showing the arrangement of the indices of multiple pages according to an embodiment of the invention. In this embodiment, the memory device is a 3D NAND-type flash. Take the 3D TLC as an example, in the exemplary page numbering shown in FIG. 3, the indices of paired pages are quite different. In addition, one word line may comprise 12 super blocks (SB). When the SPO occurs, the 12 super blocks on the same word line may all be damaged. Therefore, the whole word line should be programmed with dummy or invalid data, such that when performing a subsequent write operation, the write operation can begin from the next word line. For example, suppose that page 206 undergoes an SPO attack, and then the memory controller 110 has to write dummy or invalid from page 206 to page 310, so as to ensure that the whole word line will not be used anymore. Therefore, in this example, when an SPO has occurred, the memory controller 110 has to write dummy or invalid into 104 pages. If the host device is in an unstable condition, as an example, when the residual capacity of the battery of the host device is almost exhausted, the SPO may occur consecutively. If the protection mechanism as discussed above should be applied, a great number of pages have to be abandoned. Thereby, the memory is consumed in a very fast speed, which causes the utilization rate to greatly decrease and the Garbage Collection (GC) procedure will be triggered more easily due to the insufficient capacity. In addition, since the distance between the paired pages is large, it will take a lot of time to write dummy or invalid data or rewrite the data that have been programmed to other empty pages. If the time taken to write dummy or invalid data or rewrite those pages is greater than the time allowed for initializing the data storage device during the power-on procedure, the initialization of the memory device may fail.

In view of this, a data processing method capable of solving the problem of a decreasing utilization rate and the problem of a long dummy programming or rewrite programming time of a flash memory device, which may rise when it is trying to prevent the data stored in the flash memory device from being damaged by the sudden power-off as discussed above, are proposed.

Figure 4:
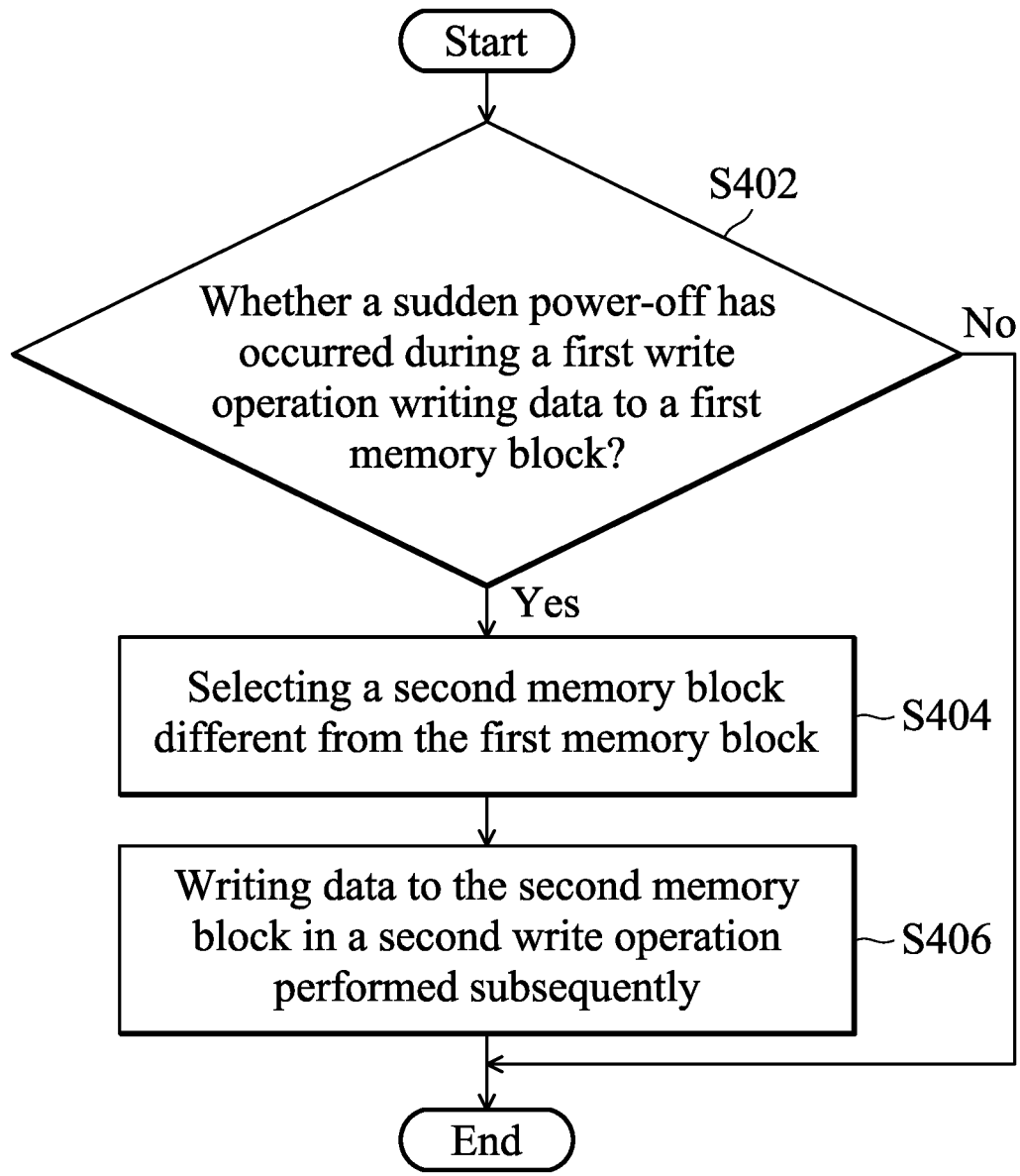
FIG. 4 is an exemplary flow chart of a data processing method according to an embodiment of the invention.

FIG. 4 is an exemplary flow chart of a data processing method according to an embodiment of the invention. The data processing method is suitable for a data storage device comprising a memory device and a memory controller, such as the data storage device 100. First of all, whether a sudden power-off has occurred during a first write operation to write data to a first memory block is determined (Step S402). If not, no follow-up step is performed. That is, in a second write operation performed thereafter, the memory controller 110 can keep writing data to the first memory block. If yes, the memory controller 110 selects a second memory block that is (Step S404) and writes data to the second memory block when a second write operation is performed subsequently (Step S406).

It should be noted that in step S404, the selected second memory device may further be utilized for performing a protection mechanism to protect the data that has been written previously, so as to ensure the data will not be damaged by the SPO. More details will be discussed in the following paragraphs.

According to an embodiment of the invention, the first memory block and the second memory block may be utilized as the data buffer.

According to an embodiment of the invention, the determination of step S402 may be performed in an initialization procedure of the data storage device 100. For example, when power is provided to the data storage device 100, the memory controller 110 may perform the determination of step S402 in an initialization procedure of the data storage device. The memory controller 110 may find out the first empty page in the first memory block, which currently serves as the data buffer, by scanning the content of the data stored in the first memory block page by page. When the first empty page in the first memory block is obtained, the index of the last page written with data can be derived.

According to an embodiment, if there is no corresponding flag or parameter can be utilized to indicate that the previous power-off is a sudden power-off or not, in order to ensure that the written data will not be damaged by the SPO, the memory controller 110 may directly regard the previous power-off as a sudden power-off and perform a predefined protection mechanism.

Figure 5:
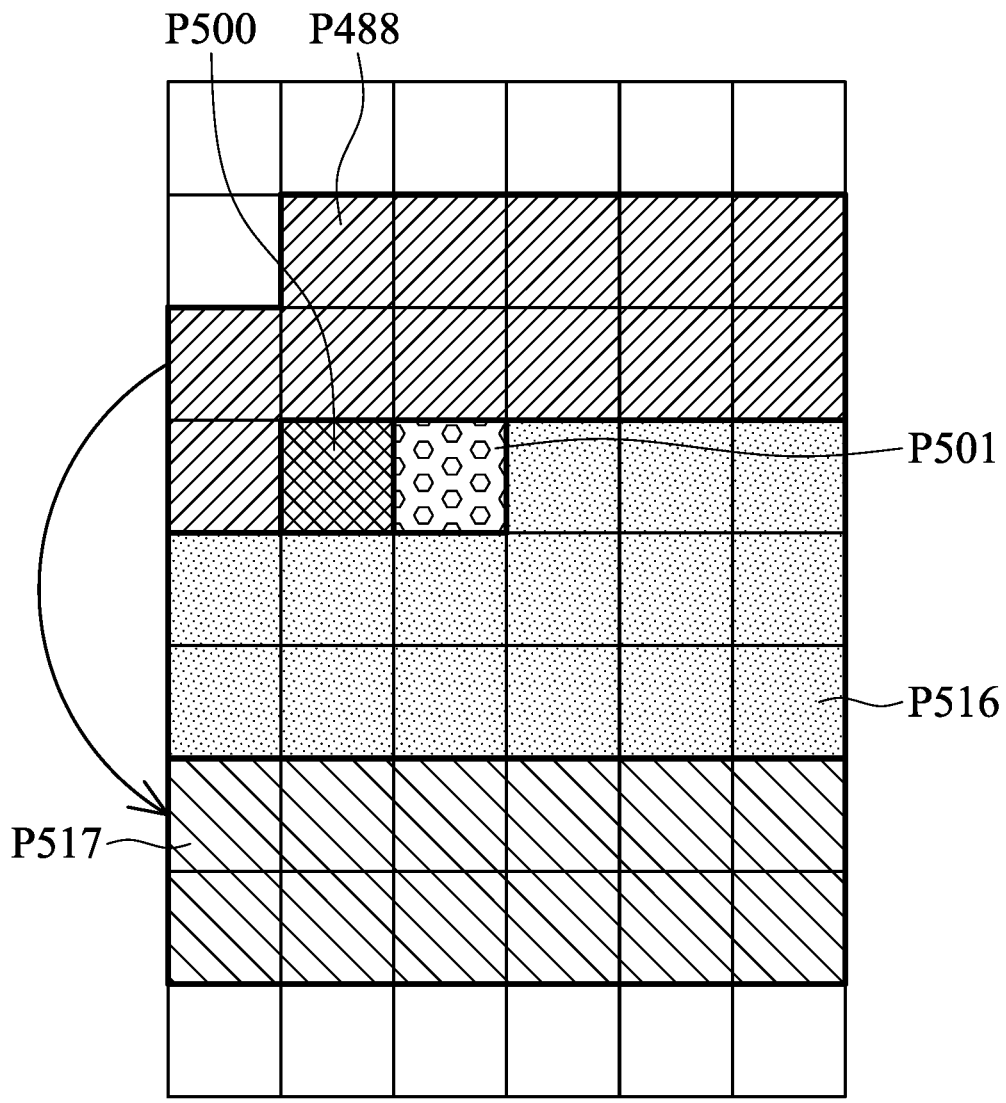
FIG. 5 is an exemplary diagram of a memory block according to an embodiment of the invention.

FIG. 5 is an exemplary diagram of a memory block according to an embodiment of the invention. As shown in FIG. 5, the memory controller 110 may scan the content of the data stored in the current memory block (e.g. the first memory block) page by page, so as to find out the first empty page. For example, in this embodiment, the first empty page is page P501. Then, the index of the last page written with data can be derived. For example, in this embodiment, the last page written with data is page P500. According to an embodiment of the invention, if the previous power-off is an SPO, the page being attacked by the SPO may be page P500 or the next one, that is, the page P501. For example, when the write operation of the page P500 has finished and the SPO occurred when the memory controller is writing data to the page P501, the page attacked by the SPO is page P501.

When performing the predefined protection mechanism, if the last page written with data (e.g., the page P500) or the first empty page (e.g., the page P501) is the LSB page (LP), the memory controller 110 may keep writing dummy or invalid data forward (that is, along the direction having increasing page indices) from the first empty page (e.g., the page P501) till the paired page of the last page written with data (e.g., the page P500) or the paired page of the first empty page (e.g., the page P501), so as to avoid writing data to the pages on the same word line in the subsequent write operations. For example, the memory controller 110 may keep writing dummy or invalid data till page P516. The operation is called "dummy program". Next, if the last page written with data (e.g., the page P500) or the first empty page (e.g., the page P501) is the CSB page (UP) or the MSB page (XP), the memory controller 110 may start to search for a predetermined number of pages backward (that is, along the direction having decreasing page indices) from the last page written with data (e.g., the page P500) till the paired page of the last page written with data (e.g., the page P500) or the paired page of the first empty page (e.g., the page P501). For example, the memory controller 110 may search for a predetermined number of pages from the page P500 backward till the page P488, read the data stored in the predetermined number of pages out and write the read data to the remaining empty pages from the next empty page, such as the page P517, after the dummy program. The operation is called "restoring program". The operation illustrated above is the predefined protect mechanism to be performed so as to make sure that the data that has already been written in the memory block will not be damaged by the SPO.

According to an embodiment of the invention, after the predefined protect mechanism is performed or when performing the predefined protect mechanism as discussed above (for example, when reading out the data stored in the predetermined number of pages), the memory controller 110 may further detect whether a number of error bits comprised in any page in the first memory block is greater than a predetermined threshold. For example, the memory controller 110 may determine whether a number of error bits obtained when the decoder 134 is performing ECC decoding on each page is greater than a predetermined threshold or not. When the number of error bits comprised in any page among the predetermined number of pages in the first memory block is greater than the predetermined threshold, the memory controller 110 can determine that a sudden power-off has occurred during the previous write operation. Next, the memory controller 110 may select a second memory block that is (Step S404) and write data to the second memory block when a second write operation is performed subsequently (Step S406).

Note that according to another embodiment of the invention, the memory controller 110 may also detect whether a number of error bits comprised in any page of the first memory block is greater than a predetermined threshold before performing the predefined protection mechanism as discussed above.

In addition, it should be noted that according to another embodiment of the invention, the memory controller 110 may also perform the detection on all the data that has been written into the first memory block, so as to detect whether a number of error bits comprised in any page that has been written with data of the first memory block is greater than a predetermined threshold.

In addition, it should be noted that according to another embodiment of the invention, when the memory controller 110 determines that no sudden power-off has occurred during the first write operation writing data to the first memory block (the No path from the step S402), the memory controller 110 may also determine not to perform the above-mentioned predefined protection mechanism. In other words, the invention is not limited to whether to perform the above-mentioned predefined protection mechanism or not.

According to an embodiment of the invention, the first memory block and the second memory block may have a multi-level cell storage structure. That is, the first memory block and the second memory block may be MLC memory blocks comprising a plurality of storage units that are able to store multiple bits of data. According to another embodiment of the invention, the first memory block and the second memory block may be TLC memory blocks comprising a plurality of storage units that are able to store three bits of data.

According to an embodiment of the invention, in step S406, the memory controller 110 may use the second memory block as an SLC memory block. Take the second memory block having a triple-level cell storage structure as an example, in step S406, for the three pages formed by each word line, the memory controller 110 only program one page thereof. For example, the memory controller 110 only writes data to the LSB page (LP) of the second memory block. In another example, the memory controller 110 may issue a control command to the memory device 120 such that the second memory block will be accessed in a manner as an SLC memory block. That is, when programming data to or reading data from the second memory device in the subsequent operations, the memory controller 110 writes data to or reads data from the second memory block in a manner as accessing an SLC memory block.

In addition, according to an embodiment of the invention, before performing the step S406, the memory controller 110 may also read the data stored in the pages of the first memory block that have to be restoring programmed out and restore the data into the second memory block so as to stabilize the data. As discussed above, the memory controller 110 may search for a predetermined number of pages backward (that is, along the direction having decreasing page indices) from the last page written with data till the paired page of the last page written with data or the paired page of the first empty page, read out the data stored in the predetermined number of pages, and write the data into the second memory block in a manner as programming an SLC memory block (that is, using the second memory block as an SLC memory block as discussed above).

According to an embodiment of the invention, although the capacity of the second memory block (that is, the amount of data that can be stored in the second memory block) is decreased (to only ⅓ of the original capacity, for example) by using the second memory block as an SLC memory block, the above-mentioned problem of a decreasing utilization rate and the time consuming problem can be solved. For example, when the host device is in an unstable condition, and when the residual capacity of the battery of the host device is almost exhausted, the SPO may occur consecutively, and the problems mentioned above will be exacerbated. By changing the way the data buffer is programmed, there is no need to abandon a great number of pages as discussed above, and the time required to perform the above-mentioned dummy program or restoring program during the initialization procedure can also be shortened.

According to an embodiment of the invention, every time a memory block becomes full, the memory controller 110 may further determine whether to keep using the other memory block having a multiple or triple-level cell storage structure as the SLC memory block.

Figure 6:
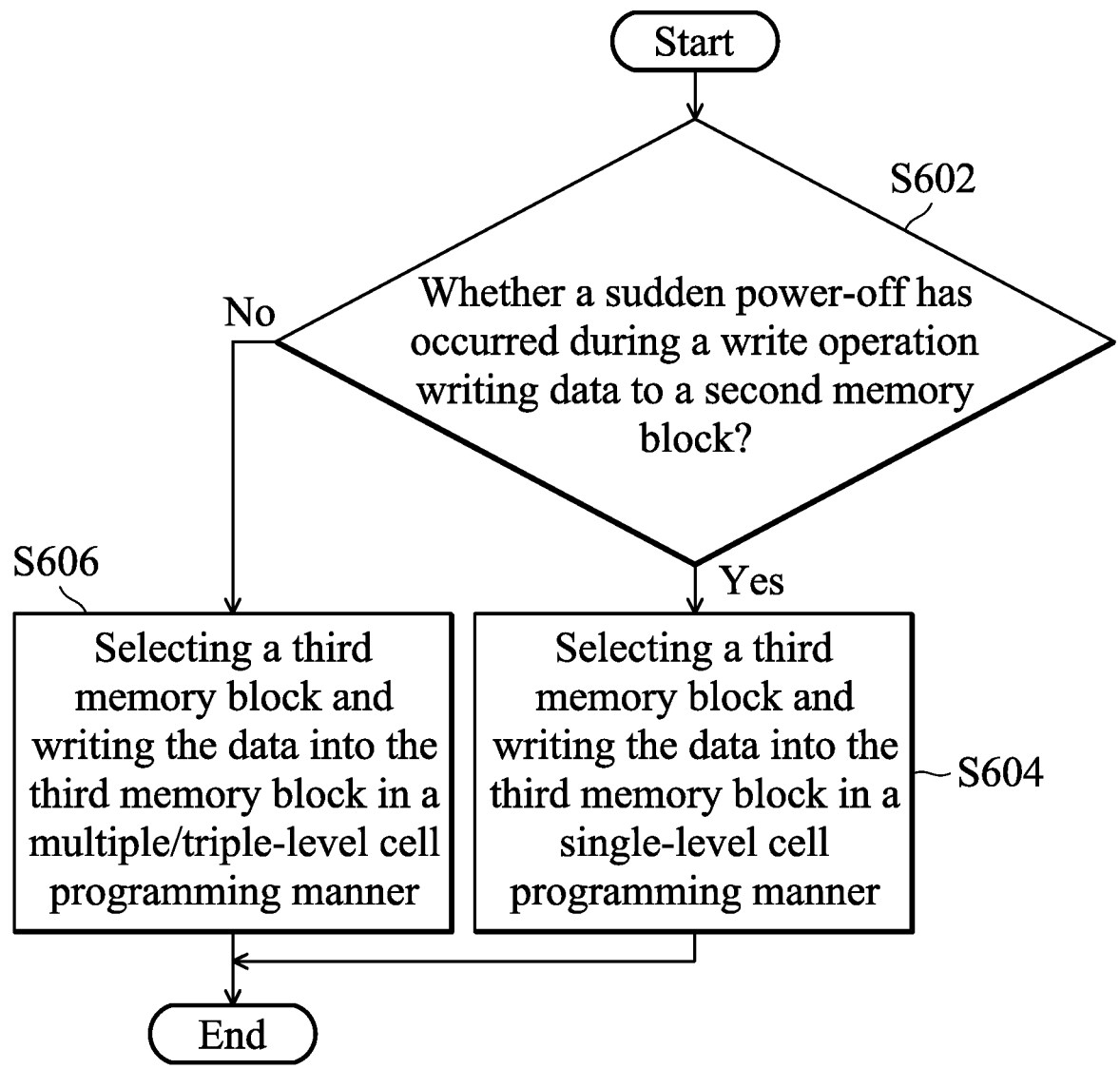
FIG. 6 is an exemplary flow chart of a data processing method according to another embodiment of the invention.

FIG. 6 is an exemplary flow chart of a data processing method according to another embodiment of the invention. This flow chart is suitable to be applied for the memory controller 110 to determine whether to keep using the other memory block having a multiple or triple-level cell storage structure as the SLC memory block when the second memory block is full. The method comprises the following steps: determining whether a sudden power-off has ever occurred during a write operation writing data to a second memory block (Step S602). If a sudden power-off has occurred during any write operation writing data to the second memory block, the memory controller 110 is configured to select a third memory block and then write the data into the third memory block in a single-level cell programming manner (that is, using the third memory block as an SLC memory block as discussed above) (Step S604). The third memory block has a Multiple-Level cell or Triple-Level cell structure as the first memory block and the second memory block, and comprise a plurality of storage units which is able to store multiple or three bits of data. If no sudden power-off has occurred during any write operation writing data to the second memory block, the memory controller 110 is configured to select a third memory block and then write the data into the third memory block in a multiple/triple-level cell programming manner just like the way it should be (that is, not using the third memory block as an SLC memory block) (Step S606). In other words, the pages comprised in the third memory block will be programmed in accordance with its original multiple/triple-level cell storage structure.

By applying the data processing method as discussed above, the problem of a decreasing utilization rate and the time consuming problem of a flash memory device, which may rise when applying the above-mentioned protection mechanism to prevent the data stored in the flash memory device from being damaged by the sudden power-off, can be effectively solved. For example, when the host device is in an unstable condition, and when the residual capacity of the battery of the host device is almost exhausted, the SPO may occur consecutively, and the problems mentioned above will be exacerbated. By changing the way the data buffer is programmed, there is no need to abandon a great number of pages as discussed above, and the time required to perform the above-mentioned dummy program or restoring program during the initialization procedure can also be shortened.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data storage device, comprising:
   a memory device, comprising a plurality of memory blocks, each memory block comprising a plurality of pages; and
   a memory controller, coupled to the memory device, configured to access the memory device, wherein in an initialization procedure of the data storage device, the memory controller is configured to determine whether a sudden power-off has occurred during a first write operation to write data to a first memory block, and when a sudden power-off is determined to have occurred during the first write operation, the memory controller is configured to select a second memory block that is different from the first memory block and write data to the second memory block in a second write operation that is performed subsequently,
   wherein during the initialization procedure, the memory controller is further configured to detect whether a number of error bits in any page in the first memory block is greater than a predetermined threshold, and when the number of error bits in one page in the first memory block is greater than the predetermined threshold, the memory controller determines that a sudden power-off has occurred during the first write operation.

2. The data storage device as claimed in claim 1, wherein the first memory block and the second memory block are Triple-Level Cell (TLC) memory blocks which comprise a plurality of storage units able to store multiple bits of data.

3. The data storage device as claimed in claim 2, wherein when performing the second write operation, the memory controller is configured to use the second memory block as a Single-Level Cell (SLC) memory block.

4. The data storage device as claimed in claim 1, wherein the memory controller only detects the number of error bits comprised a predetermined number of pages in the first memory block to determine whether a sudden power-off has occurred during the first write operation.

5. A data processing method for a data storage device, wherein the data storage device comprises a memory device and a memory controller, the memory device comprises a plurality of memory blocks, each memory block comprises a plurality of pages, the memory controller is coupled to the memory device and configured to access the memory device, comprising:
   in an initialization procedure of the data storage device, determining whether a sudden power-off has occurred during a first write operation to write data to a first memory block by the memory controller; and
   when a sudden power-off is determined to have occurred during the first write operation, selecting a second memory block that is different from the first memory block and writing data to the second memory block in a second write operation that is performed subsequently by the memory controller,
   wherein the step of determining whether a sudden power-off has occurred during the first write operation to write data to the first memory block further comprises:
   detecting whether a number of error bits in any page in the first memory block is greater than a predetermined threshold during the initialization procedure; and
   when the number of error bits in one page in the first memory block is greater than the predetermined threshold, determining that the sudden power-off has occurred during the first write operation.

6. The data processing method as claimed in claim 5, wherein the first memory block and the second memory block are Triple-Level Cell (TLC) memory blocks which comprise a plurality of storage units able to store multiple bits of data.

7. The data processing method as claimed in claim 6, further comprising:
   using the second memory block as a Single-Level Cell (SLC) memory block when performing the second write operation.

8. The data processing method as claimed in claim 5, wherein only a predetermined number of pages in the first memory block are detected by the memory controller.

* * * * *